United States Patent [19]

Maddalena

[11] 3,868,046

[45] Feb. 25, 1975

[54] EXTRUDER

[75] Inventor: John Maddalena, Ringoes, N.J.

[73] Assignee: Cities Service Company, New York, N.Y.

[22] Filed: Dec. 3, 1970

[21] Appl. No.: 94,810

[52] U.S. Cl. .................................. 222/146 HE
[51] Int. Cl. .................................. B67d 5/62
[58] Field of Search ............ 222/146 HE, 413, 474; 408/124; 239/81, 83, 84; 226/127, 181

[56] References Cited
UNITED STATES PATENTS

| | | | |
|---|---|---|---|
| 2,125,781 | 8/1938 | Harris | 222/127 |
| 2,416,370 | 2/1947 | Barstad | 226/127 |
| 2,979,237 | 4/1961 | Snow et al. | 222/413 |
| 3,043,480 | 7/1962 | Wittrock | 222/413 X |
| 3,239,103 | 3/1966 | Kelley | 222/146 HE |
| 3,281,576 | 10/1966 | Cooper et al. | 222/146 HE |
| 3,314,573 | 4/1967 | Newton | 222/146 HE |
| 3,433,082 | 3/1969 | Bitter et al. | 408/124 X |
| 3,585,361 | 6/1971 | Rosen et al. | 222/146 HE |
| 3,587,930 | 6/1971 | Schultz et al. | 222/146 HE |

*Primary Examiner*—Stanley H. Tollberg
*Assistant Examiner*—Norman L. Stack, Jr.
*Attorney, Agent, or Firm*—G. L. Rushton; E. F. Gunn

[57] ABSTRACT

A portable extruder for dispensing highly viscous 100 percent butyl sealant compounds under sufficient fore force and low enough viscosity to enter any areas desired. The extruder comprises in combination: a barrel having a rotatably mounted extruding screw axially mounted therein; a power head for driving the extruding screw mounted at one end of the barrel and an extruding die having an orifice therein mounted at the other end of the barrel. An electrical resistance heater suitably insulated on the outside is surroundingly mounted on the barrel adjacent the extruding screw in order to heat sealant compound in the barrel. A port is transversely located in the barrel adjacent the drive end of the screw for introducing sealant into the barrel.

3 Claims, 1 Drawing Figure

PATENTED FEB 25 1975
3,868,046
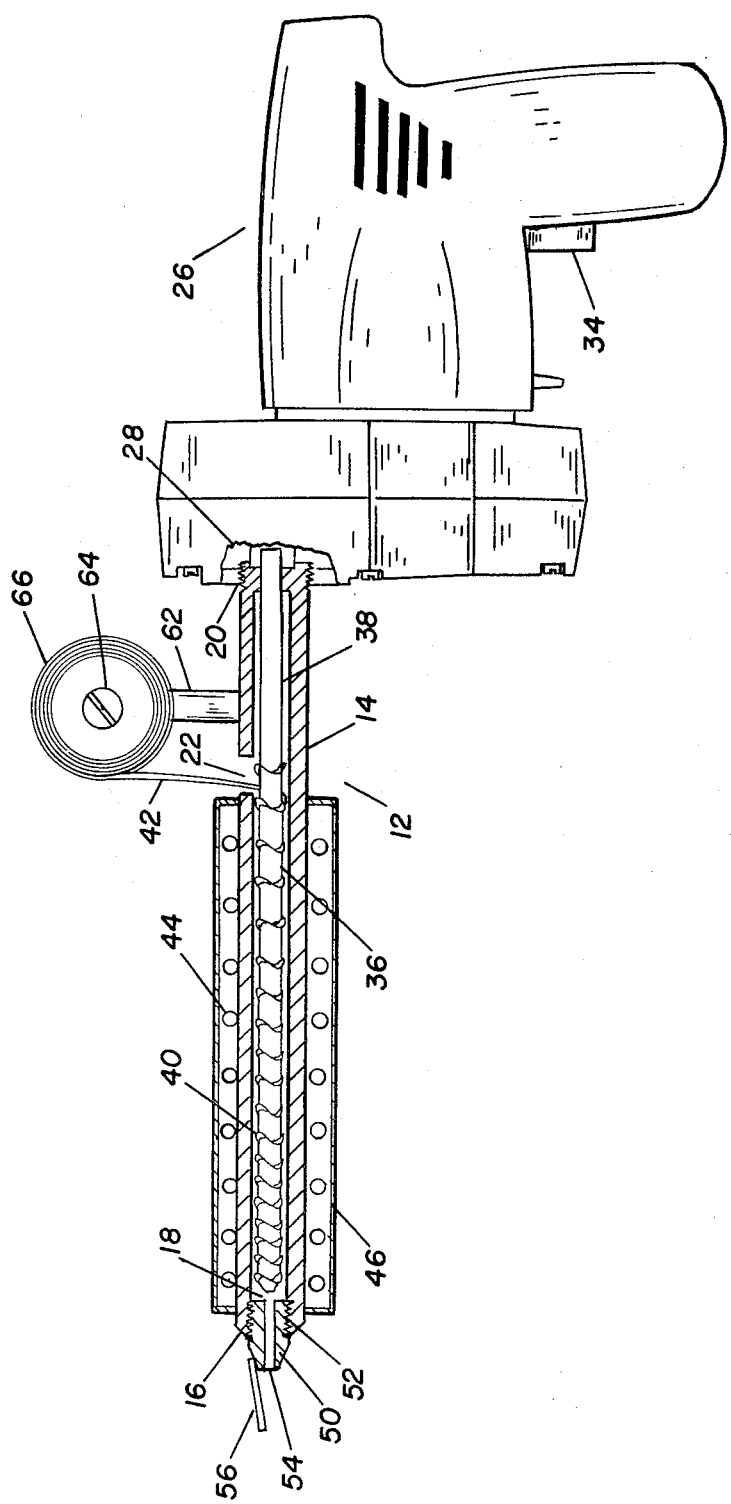
INVENTOR.
JOHN MADDALENA
BY [signature]
ATTORNEY

EXTRUDER

BACKGROUND OF THE INVENTION

This invention relates to a device for dispensing a sealant which under ambient conditions is substantially resistant to flow. More particularly this invention is directed to a portable type of caulking gun which can dispense as a viscous solid, a material which is normally resistant to flow at room temperature. Normally sealants used in caulking guns are referred to as caulks and contain various solvents and fluid conditioners which act to maintain the caulk in a relatively fluid condition. After application of the caulk, it tends to shrink as the solvents or conditioners evaporate therefrom with consequent loss of sealing. Those materials which are normally a fluid and do not contain any solvents or other conditioners will remain substantially in the same condition as when applied and therefore are unsuitable for various applications.

Normally sealants such as solid butyls which are polymers of isoprene and isobutylene tend to be substantially solid at room temperature and far too stiff to be applied as a sealant into crevices, voids or joints. The present commercial practice is to apply such butyl sealants between two substrates by physically placing the sealant material between the substrates and then applying either mechanical or pneumatic pressure to one of the substrates. This, of course, is somewhat inconvenient, uneconomical, unwieldy and inappropriate since the substrates themselves may not be able to withstand the pneumatic or mechanical forces required to adequately apply the sealant to the joints. For instance, this may be the case in the sealing of automobile windows to a car body. Accordingly, I have invented a novel portable apparatus for applying such highly viscous, virtually solid sealant to desired crevices, voids or joints as needed.

SUMMARY OF THE INVENTION

The invention is apparatus for extruding a plastic material which comprises a barrel, a rotatably mounted extruding screw axially mounted within the barrel, means for rotating the screw attached to an end of the screw, a die having an orifice attached to the opposite end of the barrel, means for heating the barrel, and means for feeding plastic materials into the barrel adjacent the extruding screw. Preferably the heating means is an electrical heating band mounted around an aluminum barrel, while the means for rotating the screw is an electrical motor driven power head and which forms the closure at the upstream side of the barrel. For ease of use, a handle is attached to the forward end of the barrel, while a pistol grip is attached to the rear end with an actuating trigger. A dispensing reel carrying the plastic material may be mounted on the barrel and a roller attached to the orifice end of the barrel to furnish partial support for the apparatus of this invention.

It is, therefore, an object of this invention to provide a novel apparatus for applying a highly viscous plastic material.

Another object of the present invention is to provide a portable extruding device for applying a heated plastic material to a substrate.

Other objects and advantages of the present invention will be apparent to those skilled in the art from the brief description of the drawings and preferred embodiments which follow.

BRIEF DESCRIPTION OF THE DRAWINGS

The drawings show in cut away view the apparatus of this invention.

BRIEF DESCRIPTION OF THE PREFERRED EMBODIMENT

Referring now to the drawing, the portable extruder 12 has aluminum barrel 14 in the form of an elongated hollow cylinder about 2 ½ inches in diameter and forming the body of the extruder. The barrel 12 is beveled at its dispensing end 16 and has an axially placed hole 18 of about 1 inch in diameter with an internally threaded portion adjacent the beveled end. The other end of the barrel has an externally threaded surface 20 extending for a small distance on its cylindrical body. Finally, there is a feed port 22 located about midway along the length of the barrel and opening into the hollow interior of the barrel. The externally threaded portion of the barrel is secured to a drive means which in the present embodiment is a skil power head 26. The power head is a gun type electrically powered motor attached to a transmission 28 for reducing the drive speed to a range of about 200 rpm. A collet 30 is internally mounted as the output element of the transmission 28. The transmission has an internally threaded portion which is mated to the externally threaded portion of the barrel. The power head also has a pistol grip portion 32 with a built in trigger 34 for activating the motor.

A rotatably driven extruding screw 36 having a shank 38 which is insertable into the collet 30 of the power head is axially mounted in the hollow interior of the barrel. The extruding screw has a screw portion 40 which extends from about midway of the barrel towards the dispensing bevel end of the barrel and has a pitch which may be varied as respects the particular nature of the material to be dispensed. As shown the screw has a 2 to 1 compression ratio and a length to diameter ratio of 2 to 1. It should be understood that other compression to diameter ratios may be used as desired. Adjacent the junction of the shank 38 and screw portion 40 is the feed port 22 through which the plastic material is fed in the form of a rope 42. Wrapped around the barrel and in thermal contact therewith is an electrical heating band 44 which is connected to a suitable electrical power source not shown. The electrical heating band acts to provide sufficient heat to bring the temperature within the barrel up to about from 250° to 300°F. An insulating material 46 is taped around the heating band to protect the operator of the extruding apparatus. Also attached to the beveled end of the barrel is an extruding die 50 in the form of a male member having an externally threaded portion 52 which is threadedly mated to the internally threaded hole 18 within the barrel and which die has an orifice 54 located therein. Attached to the die opposite its threaded portion 52 and above the orifice 54 is a flat finger 56 with which the relatively soft extruded plastic material may be flattened into a groove or slot during application.

For ease of use, an outwardly extending handle (not shown) may be mounted perpendicular to the barrel at the forward end thereof, and just adjacent its beveled outside surface in any suitable manner. A bracket 62 is attached to the drive end of the barrel extending upwards in the same direction as the feed port. An outwardly extending shaft 64 is attached to the top of the bracket 62. A reel 66 is rotatingly mounted on the shaft reel and held on by any suitable means such as a wing nut. The reel 66 holds the plastic rope 42 which is drawn from the reel into the feed port by the action of the rotating extruding screw.

In operation all that is required is to apply the power to the heating band to maintain a suitable temperature range. The operator holds the extruder by the forward handle and the pistol grip of the power head and moves the orifice over the surface on which the sealant is to be applied while applying current to the power head to dispense sealant.

Having fully described my invention and wishing to cover those modifications and variations which would be apparent to those skilled in the art but without departing from either the spirit or scope of the invention, I claim:

1. Portable apparatus for applying a sealant to a surface comprising:
  a portable extruder which can be hand held and moved and operated by hand, said extruder having
    a. an elongated barrel,
    b. an extruding screw coaxially and rotatively mounted within the barrel,
    c. a feed port for sealant toward one end of the barrel and which extends through the side of the barrel and communicates with the interior thereof adjacent the extruding screw,
    d. a sealant extrusion orifice located toward the end of the barrel opposite the end at which the feed port is located,
    e. means for heating the barrel,
    f. a power head attached to the screw and whereupon applying power to the head the extrusion screw is rotated and a sealant can be drawn into the barrel, conveyed along the length thereof and then discharged through the extrusion orifice by rotation of the extrusion screw,
  B. hand grip means on said extruder for holding, moving and thus guiding the extrusion orifice by hand over a surface onto which the sealant is applied, and
  C. a reel rotatively mounted on the extruder and a sealant rope wound upon the reel and extending from the reel to said feed port, said rope being drawn from said reel and into the extruder barrel upon rotation of said extruding screw in the barrel.

2. The apparatus of claim 1 wherein the power head comprises a transmission driven by an electric motor and has an output element attached to said screw, and further comprising a trigger for activating the electric motor while the extruder is being held by hand.

3. The apparatus of claim 1 wherein the means for heating the barrel is an electric resistance heater mounted adjacent the barrel.

* * * * *